Aug. 9, 1938.    R. B. RESPESS    2,126,413
HANGAR
Filed Feb. 21, 1936    6 Sheets-Sheet 2
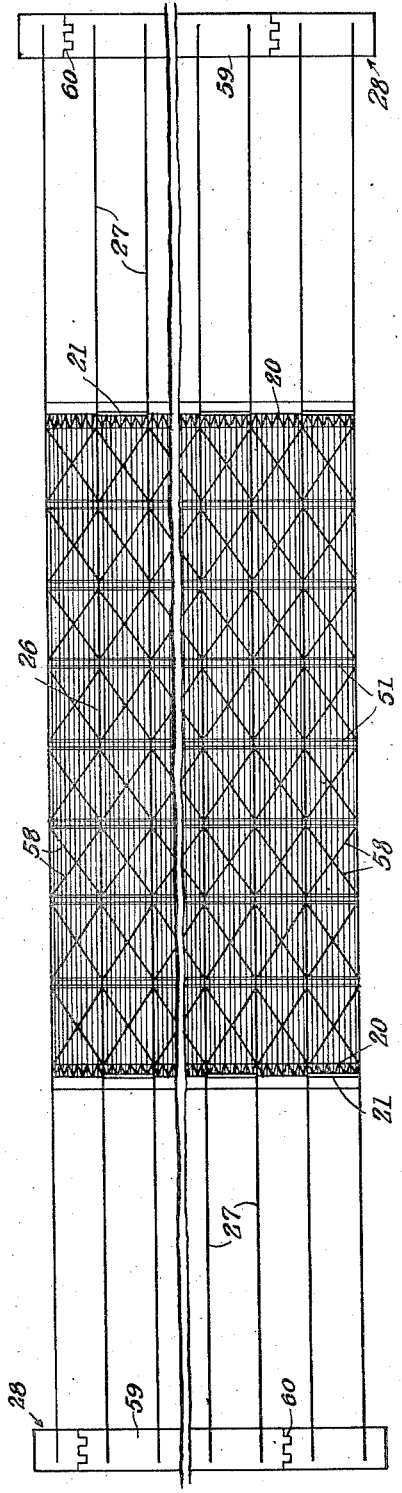
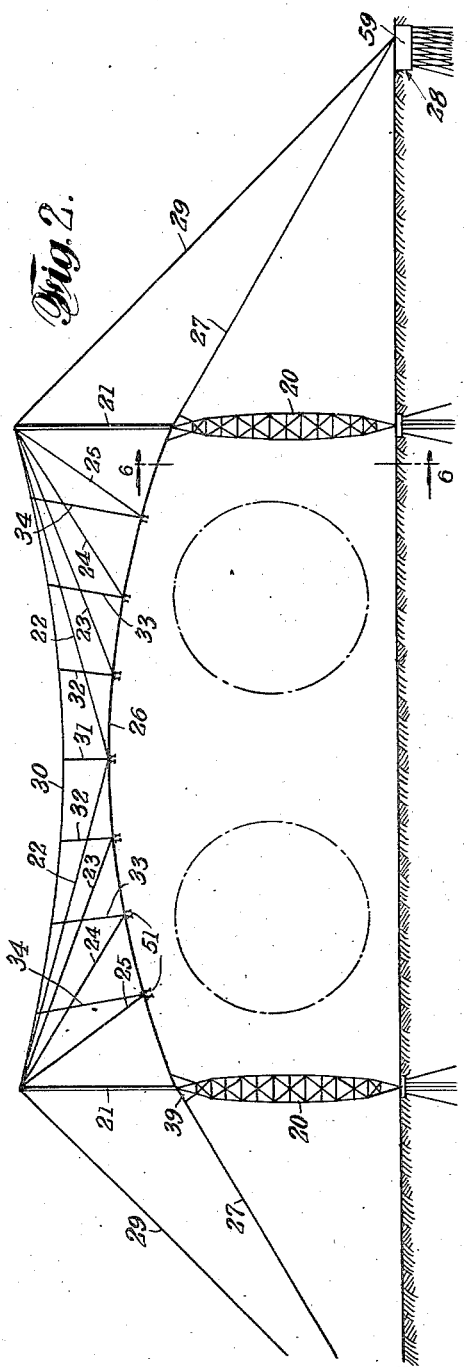
INVENTOR
ROLAND B. RESPESS
BY
ATTORNEY

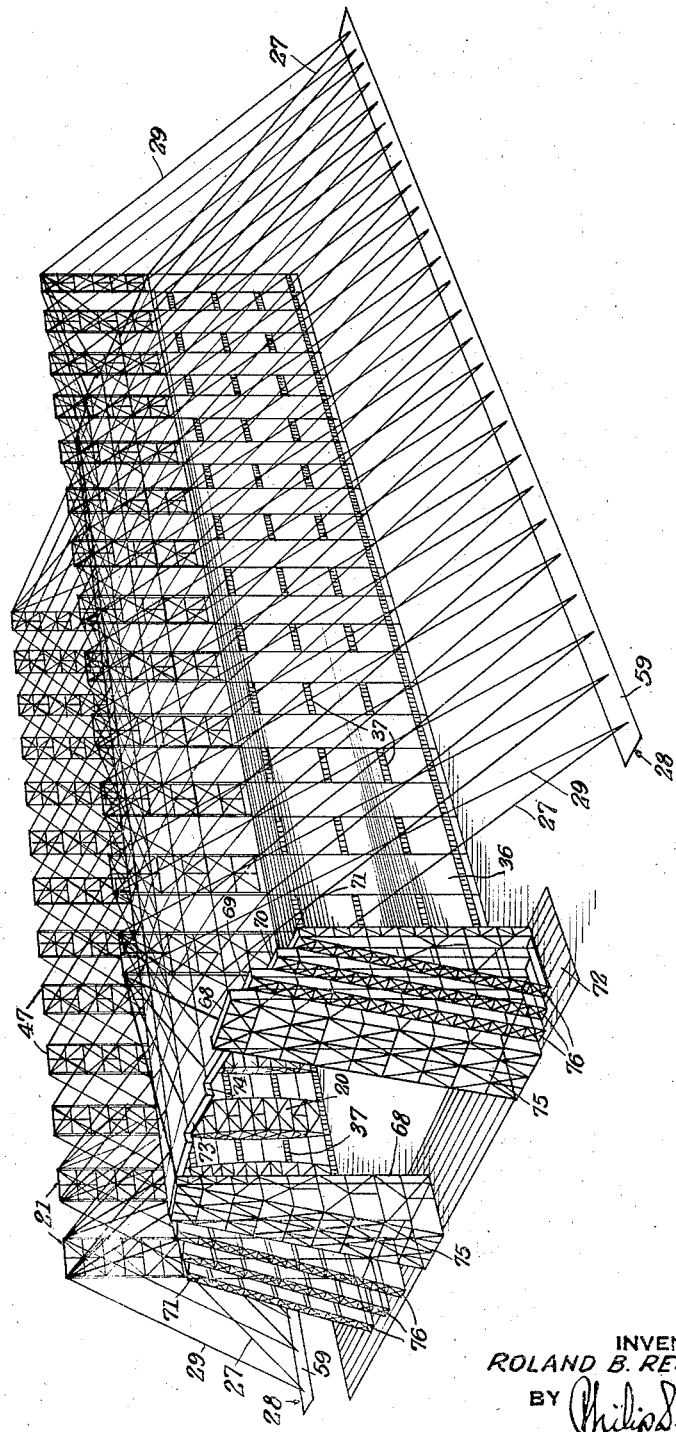

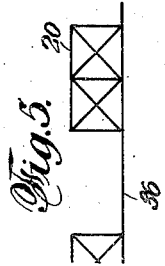
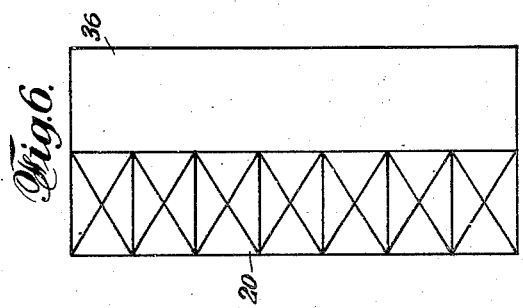
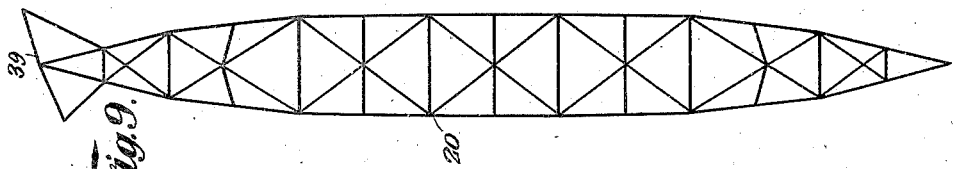
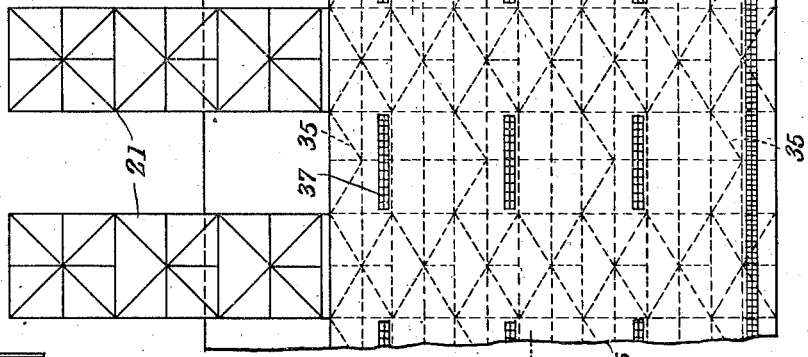
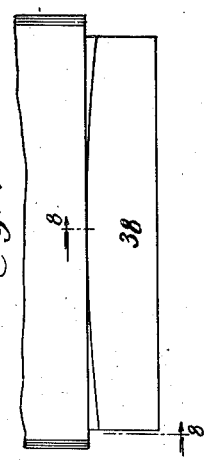
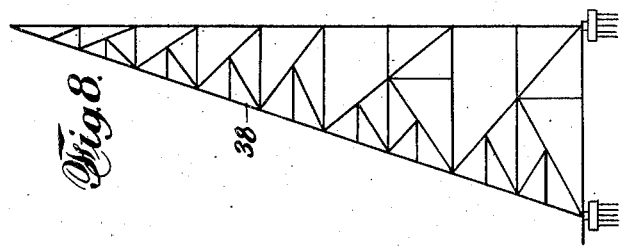

Aug. 9, 1938.                R. B. RESPESS                 2,126,413
                                HANGAR
                         Filed Feb. 21, 1936           6 Sheets-Sheet 4
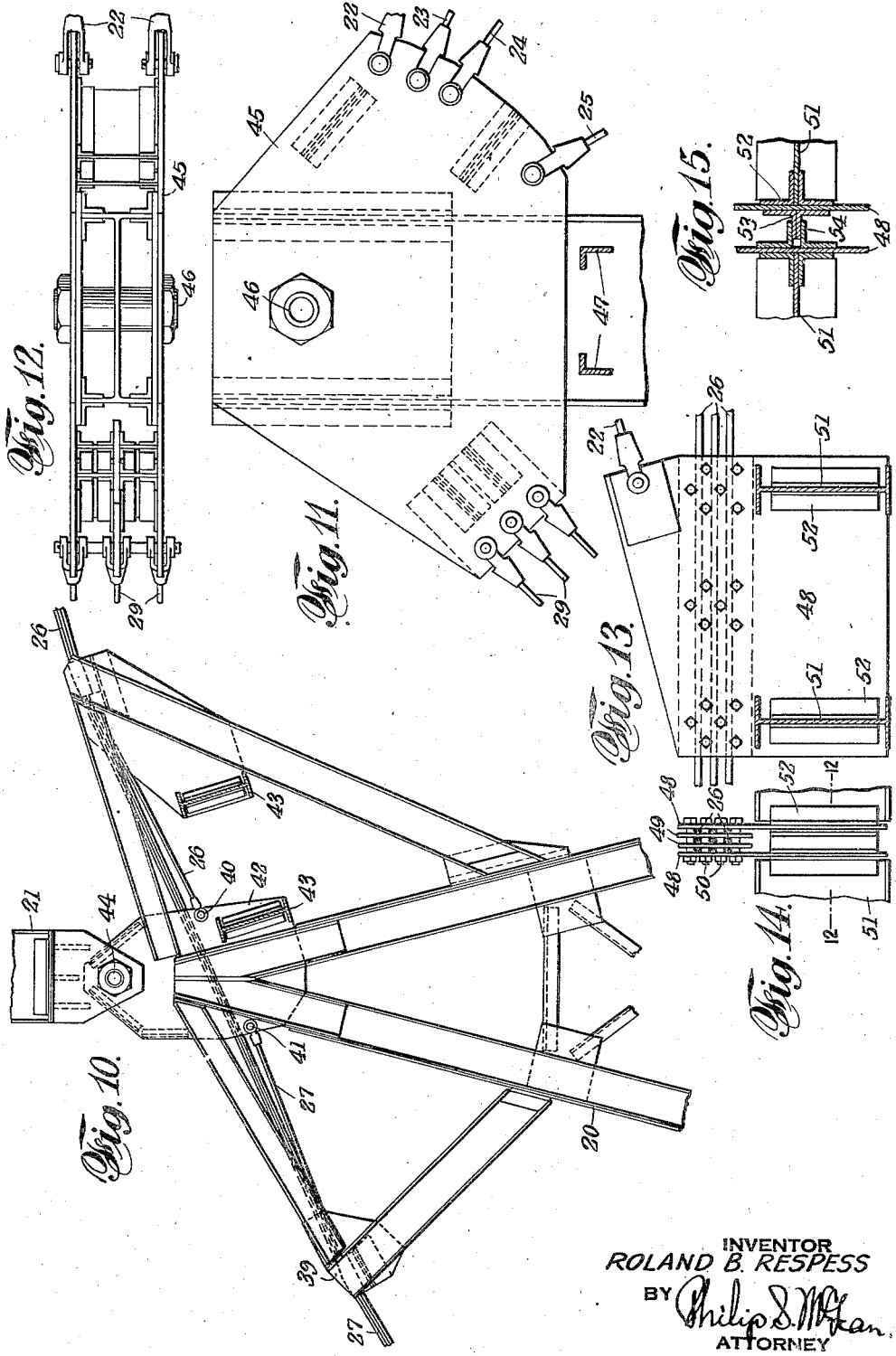

Patented Aug. 9, 1938

2,126,413

UNITED STATES PATENT OFFICE 2,126,413

HANGAR

Roland B. Respess, Wickford, R. I.

Application February 21, 1936, Serial No. 65,021

3 Claims. (Cl. 189—1.5)

This invention relates to large structures, such as "hangars" or "docks" for dirigibles and the like.

The objects of the invention are to enable large structures for the above or other purposes to be built at reasonably low cost, from standard materials and to provide a structure which will have the necessary strength to resist wind pressure and other forces.

Other objects and the novel features of the invention are set forth or will appear as the specification proceeds.

The drawings accompanying and forming part of the specification illustrate a definite practical embodiment of the invention, but it should be understood that structure may be modified and changed as regards this particular disclosure, all within the true intent and broad scope of the invention as expressed in the appended claims.

Fig. 1 is a perspective view of a form of the invention as incorporated in an airship dock or hangar.

Fig. 2 is a typical intermediate cross-section.

Fig. 3 is a broken partial plan view.

Fig. 4 is a broken side elevation of an intermediate portion of one of the side walls.

Fig. 5 is a broken horizontal sectional detail as on line 5—5 of Fig. 4.

Fig. 6 is a broken interior view as on line 6—6 of Fig. 2.

Fig. 7 is a broken plan of an end portion of the hangar.

Fig. 8 is a vertical sectional view of the same as on line 8—8 of Fig. 7.

Fig. 9 is a side elevation of one of the wall columns.

Fig. 10 is a broken and partly sectional enlarged detail of the upper end portion of one of the side wall columns.

Fig. 11 is a broken and part sectional detail showing structural features at the upper end of one of the roof posts which are mounted on the side wall columns.

Fig. 12 is a broken plan of the parts appearing in Fig. 11.

Fig. 13 is a broken part sectional side view of one of the intermediate joints for the suspended roof.

Fig. 14 is a view taken at right angles thereto, showing particularly how the roofing cables are clamped.

Fig. 15 is a broken sectional detail as on line 12—12 of Fig. 14, showing the slip joint between longitudinal roof beams.

Figure 16:
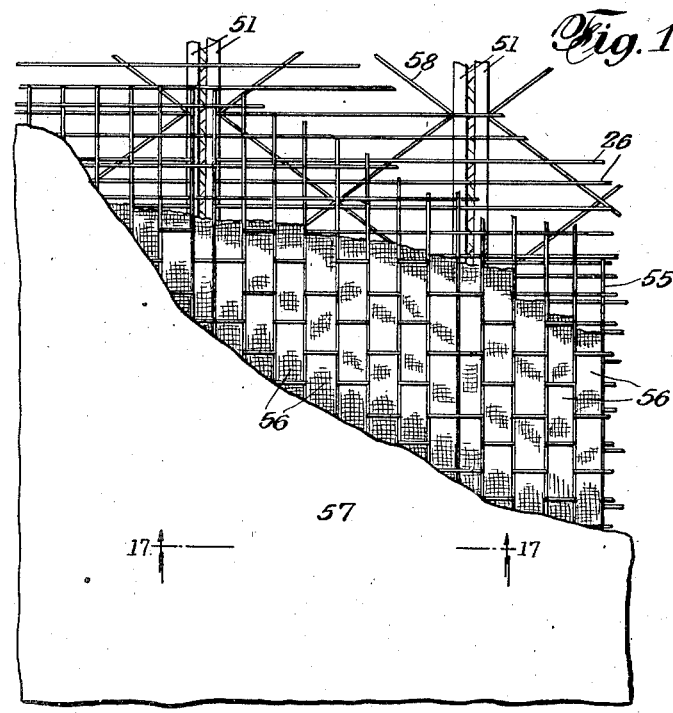
Fig. 16 is a broken plan view of a portion of the roof structure.

These drawings illustrate a structure on the order of 1000 feet long, 500 feet wide and 225 feet high.

In structures approaching such dimensions heretofore, the arch form of construction has been employed. This is costly, relatively heavy and at best has certain inherent weaknesses which may lead to failure.

The present invention differs from foregoing projects in the employment of a suspension system utilizing steel bridge strands for the main carrying members. Thus at relatively low cost there is produced a structure of great safety and permanence, comparable to these same factors in a modern suspension bridge.

With this introductory understanding attention is first directed to Figs. 1 and 2 which, briefly stated, show a structure made up of side wall columns 20, of lattice formation which may, for example, be approximately 175 feet high, surmounted by posts or columns 21, which support at each side the diagonal suspension cables 22, 23, 24, 25, carrying the roofing cables 26. The wall columns are held up-right by diagonal stays 27, extending to anchorages 28, at the sides of the structure and similarly, the roof posts 21, which also may be of lattice construction, are stayed by the cables 29, which may be rooted in the same anchorages.

The roof suspending cables 22, 23, 24, 25, are shown connected with the center and intermediate portions of the roofing cables at points to support the latter in a desired arch formation, continuing or approximately conforming to the upward inclination of the side stays 27.

While this particular method of suspension is a desirable and practical one, the catenary type of suspension indicated in Fig. 2 and consisting of the substantially parabolic cables 30, with hanging supports 31, 32, 33, 34, to the roofing cables, may be substituted for or used in conjunction with the purely diagonal stay systems 22, 23, 24, 25.

Figs. 4, 5 and 6 illustrate details of the box girders 20, forming the wall columns, connected in suitably spaced relation by the trusses 35, Fig. 4, and covered by suitable sheathing 36, such as corrugated metal siding. Windows are indicated in this siding at 37, to provide desired lighting.

If the structure is to be permanently closed at one or both ends, end walls such as indicated at 38, Figs. 7 and 8, may be provided, these being outwardly trussed as shown particularly in Fig. 8, to stand air pressures and other forces to which the structure is subject.

The wall columns carry saddle structures 39, Fig. 9, for support of the roofing and stay cables 26, 27. As indicated in the larger detail Figure 10, these two sets of cables may in fact be continuous, extending upwardly from anchorage at one side of the structure over supporting saddles 39, at one wall, across the roof span, and over the saddles at the opposite wall downwardly to anchorage at the opposite side of the structure. Some of these cables however, may be interrupted and anchored to the tops of the columns as indicated in this view, where one roof cable and one stay cable in each set is connected at 40, 41, with a gusset plate 42, fixed in the upper end of the column. Two beams are shown in section at 43, in this view, constituting part of the truss-work connecting adjoining columns and to which may be secured transverse roof ropes or cables between the columns.

The posts 21 which carry the suspension cables are shown in Fig. 10 as supported by heavy pivot bolts 44, set in the gusset plates 42, in the upper ends of the wall columns.

Figs. 11 and 12 show details at the upper ends of the roof posts, comprising spaced anchorage plates 45, held to the top of the posts by bolts 46, and having the inclined stays 29, secured thereto at the outside and the diagonal suspension cables 22, 23, 24, 25, secured thereto at the inside. Fig. 11 shows in section two of the truss members 47, connecting adjoining posts in pairs, as indicated in Fig. 1.

Figs. 13, 14, 15, illustrate details of the joints between the diagonal suspension cables and the roofing cables. As appears particularly in Fig. 14, sufficient grip on the roofing cables is obtained by locating them between side clamp plates 48, and intermediate clamp plates 49, which can be brought together by through bolts 50. In this particular illustration, the roofing cables are grouped in units of nine, with a row of three vertically related cables between each pair of adjoining plates and it will be appreciated that for a greater or less number of cables gripped in a unit, the clamp may be modified accordingly.

The side plates 48 of the roof clamps are shown as having longitudinally extending roofing beams 51, attached thereto by angles 52, Figs. 13, 14, 15, and to hold these beams in alignment, one of the side clamp plates is shown as carrying a rib 53, slidingly fitting in a grooveway 54, carried by the other side clamp plate. This slide connection as indicated in Fig. 15, may be made up of properly related angles on the inner faces of the clamp plates.

The actual roof covering may vary in construction according to local conditions and requirements.

Figure 17:
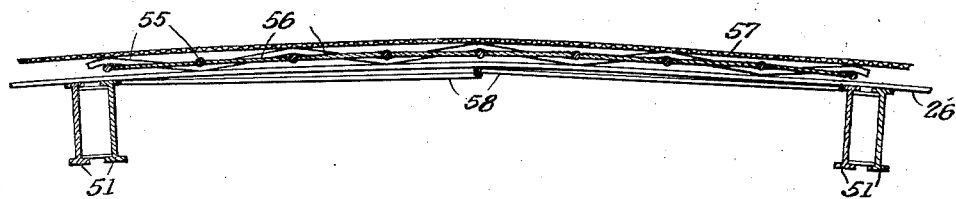
Fig. 17 is a broken cross-sectional detail as on line 17—17 of Fig. 16.

As illustrated in Figs. 16 and 17, woven wire mesh 55 is laid over the transverse strands 26, strips 56, of fabric or metal are interwoven therethrough and a heavy canvas or other suitable cover 57, is laced or otherwise securely fastened in overlying position. The canvas or cover layer may be painted, coated or otherwise finished with asphaltic or other suitable roofing material.

For fire-proofing reasons, the interlaced strips 56, preferably may be of thin sheet metal such as aluminum. The panels of roofing between the longitudinal girders 51, may be braced by diagonal connections or shear wire 58, Figs. 3, 16 and 17.

Figure 18:
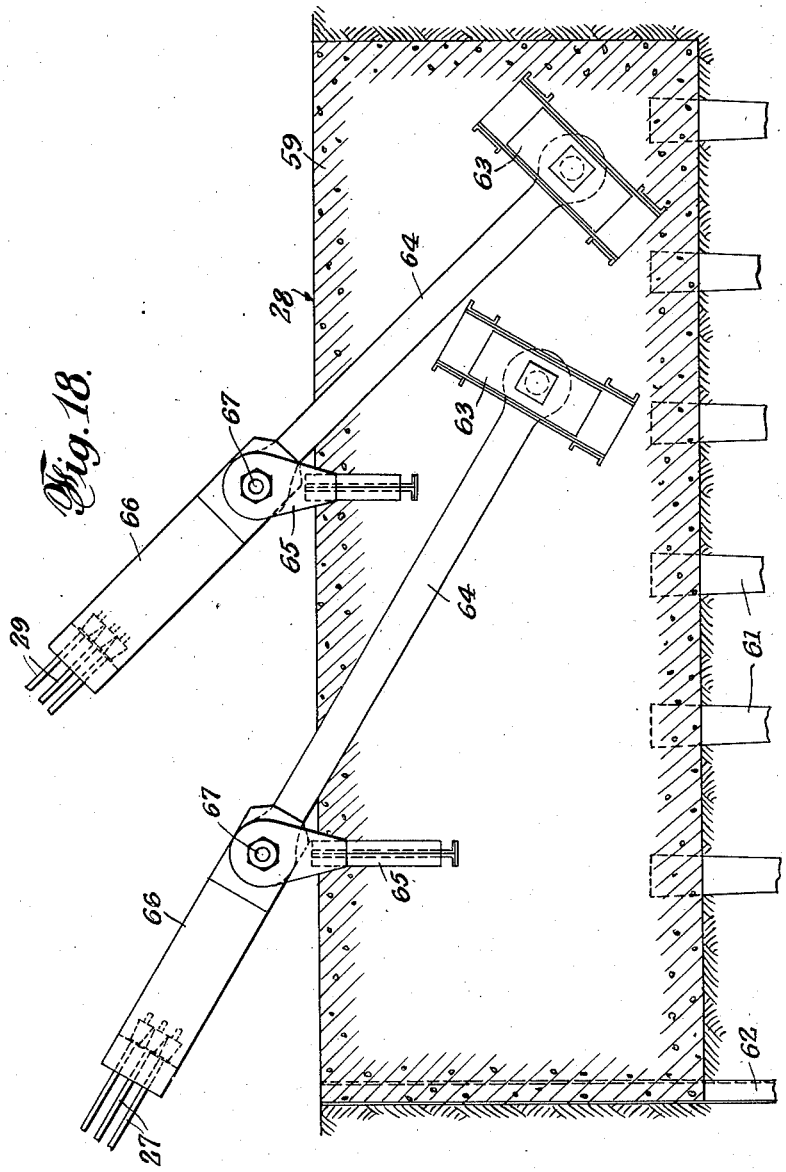
Fig. 18 is a broken part sectional view illustrating details of the anchorage for the side stays.

As shown particularly in Figs. 2, 3 and 18, the anchorages 28, may be made up of blocks of concrete 59, arranged with expansion joints 60, at suitable intervals and set on piles 61, against abutment walls of sheet piling 62. Buried in these blocks are the anchor keys 63, to which are connected shanks 64, supported in properly angled relation by studs 65, the cable holding terminals 66, having pivotal connection at 67, with the anchor shanks and positioning lugs 64, 65. Turnbuckles or other suitable cable adjusting devices may be located at or adjacent these anchorages, so that the load carrying cables may be properly tensioned and kept so.

As previously indicated, the end or ends of the structure may be permanently closed by a braced end wall or walls such as shown in Fig. 8. For hangar service however, at least one and possibly both ends should be capable of being fully opened. This may be provided for by a sectional end door or doors, such as shown in Fig. 1 and made up of over-sliding door sections 68, 69, 70, 71, for each half of the structure and mounted for travel on transverse tracks 72. As here shown, the sections 68 meet at the center, the next sections 69 enter the shouldered end portions 73 of the roof behind the center sections, and sections 70 pass behind the section 69 into the shouldered portions 74 of the roof, the last sections 71, entering a similarly shouldered portion back of sections 70. The center door sections 68 which have to carry the main pressure load are shown constructed as full diagonally braced structures 75, but the other door sections are indicated as made up of flat upright doors with diagonal bracing 76, at their outer non-overlapping ends. This construction permits opening up any desired portion of the hangar, at the center or at the sides and to any required extent. In the fully closed condition, the overlapping of one door section by the next provides a fully braced condition and in the open relation, the door sections fully telescope as indicated in Fig. 1, to brace them as then separated from the hangar structure.

The uprights at the sides of the building are subjected only to compression loads and the cables which they support are subjected only to tension. There is no reversal of forces and consequently, no fatigue. These compression and tension members may be made up of standard structural materials, relatively light in weight but of great strength. Steel bridge strands may be employed for all tension members to form a strong, durable and permanent structure. The suspended upwardly arched roof provides a maximum unobstructed interior at a minimum weight and expense of construction.

Terms employed, such as bridge strands, wires, cables, ropes and the like, have been used in a descriptive rather than in a limiting sense, it being appreciated that the size and exact character of such members may change with the magnitude, type and location of the structure. This form of construction takes care of all wind loads, both from within and from without.

The structure is such that the parts can be fabricated where most economical and be quickly assembled at the desired location. The longitudinal roof girders provide desirable supports for catwalks, passageways, equipment or accessories. Elevators may be run to the top of the roof posts, which latter, in a structure like that here illustrated, provide desirable points of vantage, having a height in this particular showing of approximately 300 feet above ground level.

What is claimed is:

1. Roofing of the character disclosed, comprising in combination, longitudinally and transversely extending girders and cables, suspension supporting means for the same, mesh wire fabric carried thereby, strips interwoven through the mesh of said fabric and roofing material overlying said strips and mesh fabric.

2. A hangar for dirigibles or other purposes, comprising side walls, roofing supported by said walls and stepped at one end of the structure, oversliding door sections, spaced parallel trackways on which said oversliding door sections are mounted in position to aline with the steps in the end of the roofing structure, said door sections overlapping in the closed relation of the same when cooperating with the stepped roof end and overlapping in telescopic relation when moved back on the trackways in the open position.

3. A hangar for dirigibles or other purposes, comprising side walls, roofing between said side walls, said roofing being stepped at one end of the structure, oversliding door sections, spaced parallel trackways over which said sliding door sections are mounted in position to align with the steps of the roofing structure, said door sections overlapping in the closed relation of the same when cooperating with the stepped roofing end and overlapping in telescopic relation when moved back on the trackways in the open position, said door sections having non-overlapping outer end portions and diagonal bracing for said non-overlapping outer end portions of said door sections.

ROLAND B. RESPESS.